United States Patent
Daniel

(10) Patent No.: US 10,345,522 B2
(45) Date of Patent: Jul. 9, 2019

(54) MULTI-CORE SILICON WAVEGUIDE IN A MODE-CONVERTING SILICON PHOTONIC EDGE COUPLER

(71) Applicant: Lumentum Operations LLC, Milpitas, CA (US)

(72) Inventor: Brian Daniel, Milpitas, CA (US)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 16/011,155

(22) Filed: Jun. 18, 2018

(65) Prior Publication Data

US 2019/0086611 A1    Mar. 21, 2019

Related U.S. Application Data

(60) Provisional application No. 62/560,923, filed on Sep. 20, 2017.

(51) Int. Cl.
*G02B 6/14* (2006.01)
*G02B 6/10* (2006.01)
(Continued)

(52) U.S. Cl.
CPC .............. *G02B 6/14* (2013.01); *G02B 6/105* (2013.01); *G02B 6/122* (2013.01); *G02B 6/305* (2013.01);
(Continued)

(58) Field of Classification Search
CPC .......... G02B 6/14; G02B 6/105; G02B 6/305; G02B 6/122; G02B 2006/12038; G02B 2006/12061
See application file for complete search history.

(56) References Cited

U.S. PATENT DOCUMENTS 8,744,225 B2 * 6/2014 Yoshida ................. G02B 6/125
                                                                385/43
9,128,240 B2 * 9/2015 Hatori ....................... G02B 6/12
(Continued)

OTHER PUBLICATIONS

Arnab Dewanjee et al., "Demonstration of a compact bilayer inverse taper coupler for Si-photonics with enhanced polarization insensitivity", Research Article Optics Express, Dec. 12, 2016, 10 pages.
(Continued)

*Primary Examiner* — Ryan A Lepisto
(74) *Attorney, Agent, or Firm* — Harrity & Harrity, LLP

(57) ABSTRACT

A mode-converting optical coupler may include a secondary waveguide to guide light in one or more secondary optical modes, and a primary waveguide to guide light in one or more primary optical modes, each adiabatically coupled to a secondary optical mode of the secondary waveguide having a secondary mode index. Each primary optical mode of the primary waveguide may have a first primary mode index near a first end and a second primary mode index near a second end. The first primary mode index may be lower than the second primary mode index. The secondary mode index may be between the first primary mode index and the second primary mode index. The primary waveguide may include a plurality of silicon core structures including a central core structure arranged between a first neighboring core structure and a second neighboring core structure.

20 Claims, 7 Drawing Sheets

(51) Int. Cl.
*G02B 6/30* (2006.01)
*G02B 6/122* (2006.01)
*G02B 6/12* (2006.01)

(52) U.S. Cl.
CPC .............. *G02B 2006/12038* (2013.01); *G02B 2006/12061* (2013.01)

(56) References Cited

U.S. PATENT DOCUMENTS

| | | | | |
|---|---|---|---|---|
| 9,195,001 B2 * | 11/2015 | Hatori | .................. | G02B 6/1228 |
| 9,465,163 B2 * | 10/2016 | Kumar | .................. | G02B 6/122 |
| 9,563,018 B2 * | 2/2017 | Budd | .................. | G02B 6/1228 |
| 9,664,855 B2 * | 5/2017 | Sodagar | .................. | G02B 5/20 |
| 9,759,864 B2 * | 9/2017 | Painchaud | .............. | G02B 6/14 |
| 9,904,011 B2 * | 2/2018 | Hatori | .................. | G02B 6/1228 |
| 9,964,704 B2 * | 5/2018 | Hatori | ...................... | G02B 6/43 |
| 10,031,291 B1 * | 7/2018 | Horth | .................. | G02B 6/29346 |
| 2012/0156369 A1 * | 6/2012 | Kim | .................. | G02B 6/12002 |
| | | | | 427/163.2 |
| 2015/0247974 A1 * | 9/2015 | Painchaud | ............. | G02B 6/305 |
| | | | | 385/14 |
| 2018/0067259 A1 * | 3/2018 | Teng | .................. | G02B 6/1228 |
| 2018/0120504 A1 * | 5/2018 | Qi | .......................... | G02B 6/124 |

OTHER PUBLICATIONS

Nobuaki Hatori et al., "A Hybrid Integrated Light Source on a Silicon Platform Using a Trident Spot-Size Converter", Journal of Lightwave Technology, vol. 32, No. 7, Apr. 1, 2014, 8 pages.

* cited by examiner

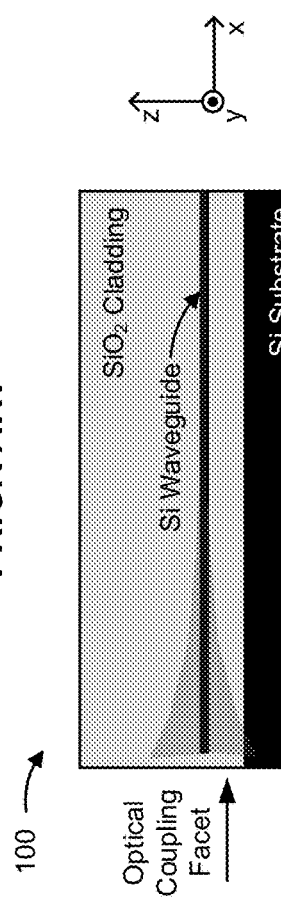
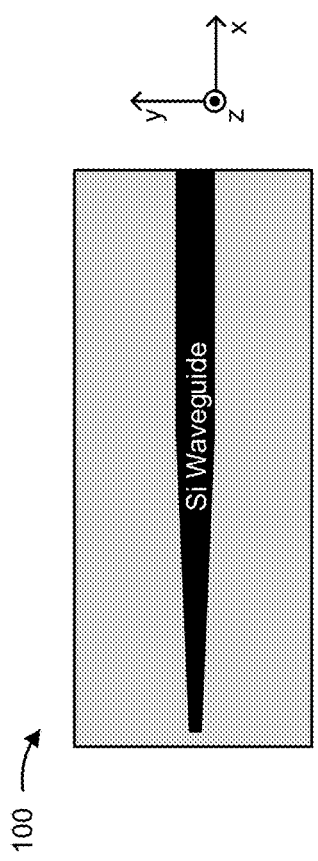
FIG. 1A PRIOR ART
FIG. 1B

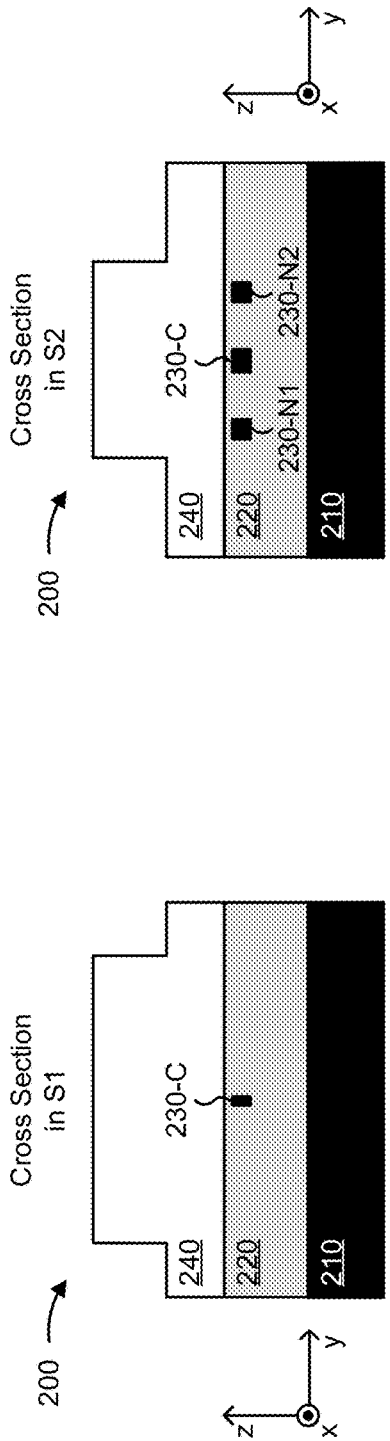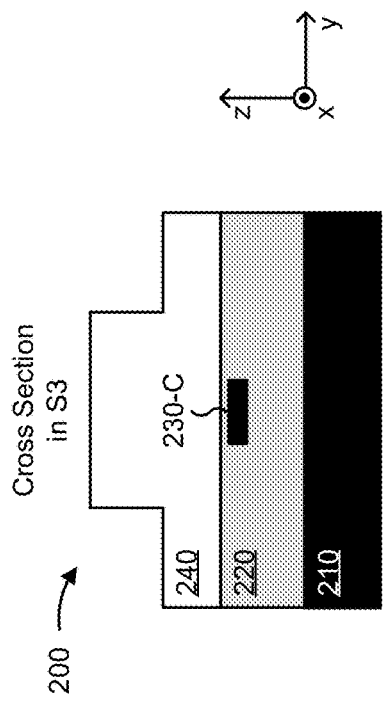

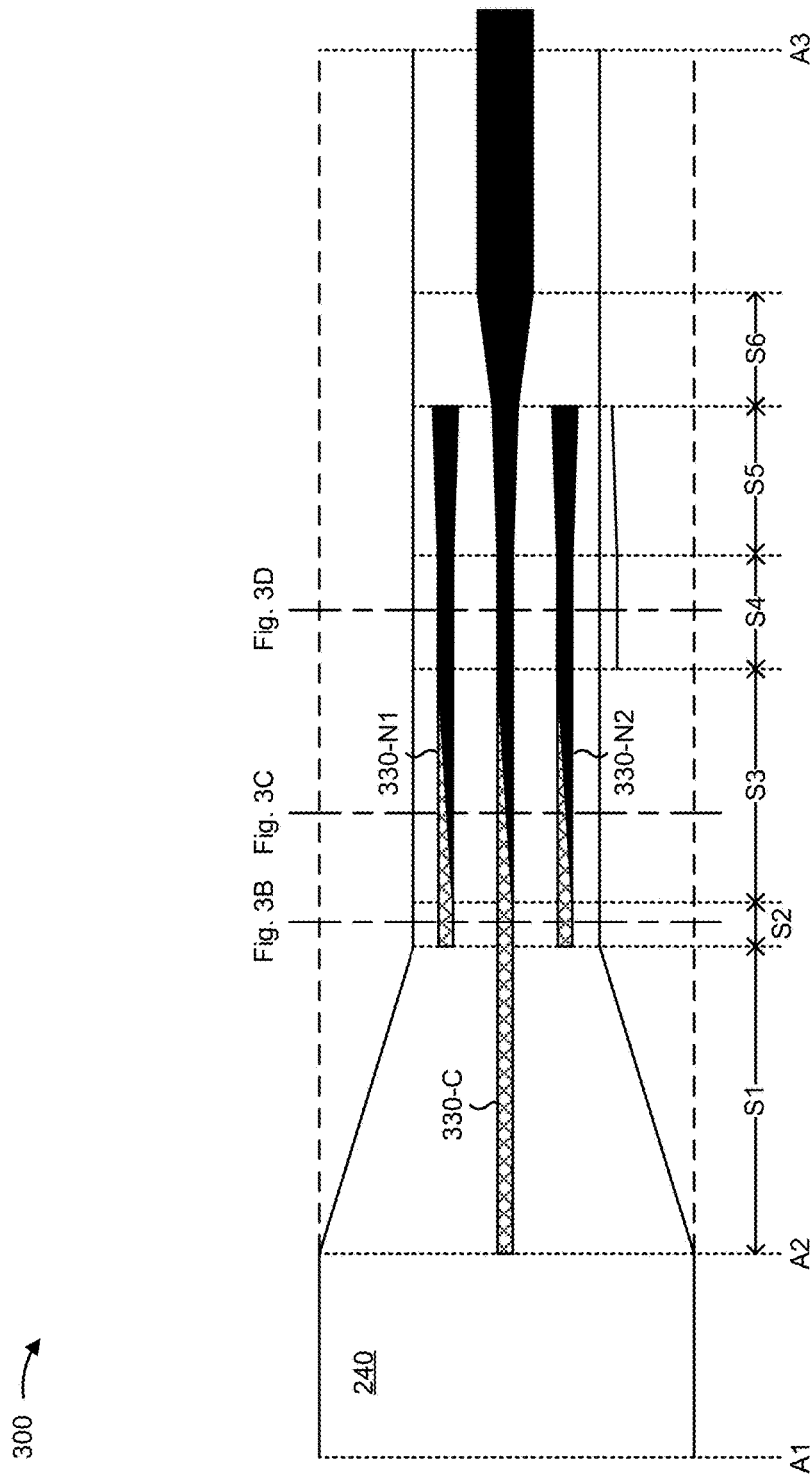

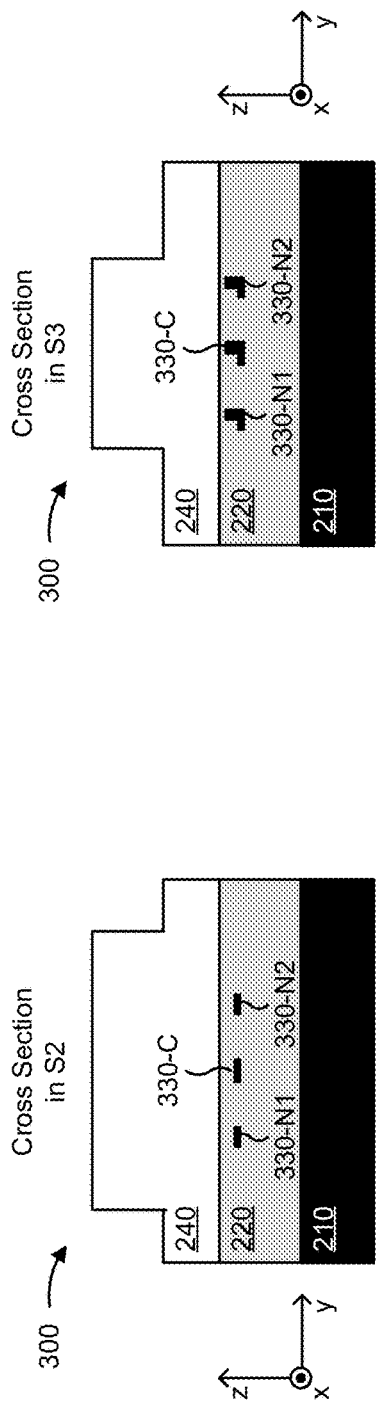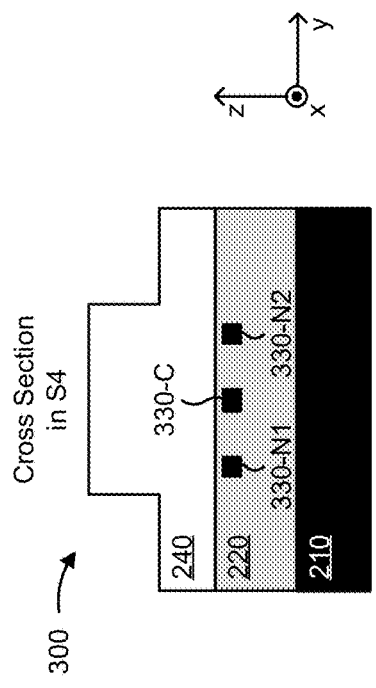

US 10,345,522 B2

MULTI-CORE SILICON WAVEGUIDE IN A MODE-CONVERTING SILICON PHOTONIC EDGE COUPLER

RELATED APPLICATION

This application claims priority under 35 U.S.C. § 119 to U.S. Provisional Patent Application No. 62/560,923, filed on Sep. 20, 2017, the content of which is incorporated by reference herein in its entirety.

TECHNICAL FIELD

The present disclosure relates generally to a mode-converting silicon photonic edge coupler and, more particularly, to use of a multi-core silicon waveguide in a mode-converting silicon photonic edge coupler for reducing coupler length and insertion loss.

BACKGROUND

Coupling light between an optical fiber or laser diode and a silicon photonic optical waveguide may be achieved using an edge coupler. An edge coupler can be fabricated on the silicon photonic chip, and can be used for efficient coupling in, for example, a butt-coupled configuration. One approach for designing an edge coupler device on a silicon photonic chip is a mode-converting edge coupler design. In such a design, a comparatively larger secondary waveguide is fabricated in close proximity to a comparatively smaller primary silicon waveguide. Here, light couples to the secondary waveguide from the optical fiber or the laser diode at an edge of the silicon photonic chip. The secondary waveguide may be designed such that an optical mode of the secondary waveguide matches that of the optical fiber or the laser diode. Light then adiabatically transfers from the optical mode of the secondary waveguide into an optical mode of the primary silicon waveguide. This transference can be brought about based on engineering one or more dimensions (e.g., a width) of the primary silicon waveguide (e.g., by reducing the width of the primary silicon waveguide nearer to an optical coupling facet of the secondary waveguide).

SUMMARY

According to some possible implementations, a mode-converting optical coupler, may include: a secondary waveguide to guide light in one or more secondary optical modes; and a primary waveguide, to guide light in one or more primary optical modes, each adiabatically coupled to a secondary optical mode of the secondary waveguide having a secondary mode index, wherein each primary optical mode of the primary waveguide has a first primary mode index near a first end and a second primary mode index near a second end, wherein the first primary mode index is lower than the second primary mode index, and wherein the secondary mode index is between the first primary mode index and the second primary mode index, and wherein the primary waveguide comprises a plurality of core structures including a central core structure arranged between a first neighboring core structure and a second neighboring core structure, and wherein a width of each of the plurality of core structures tapers towards the first end of the primary waveguide, wherein each of the plurality of core structures is arranged in a direction that is substantially parallel to the direction in which light propagates through the primary waveguide, and wherein the plurality of core structures comprises silicon (Si).

According to some possible implementations, a mode-converting optical coupler, may include: a secondary waveguide to guide light in one or more secondary optical modes; and a primary waveguide, to guide light in one or more primary optical modes, each adiabatically coupled to a secondary optical mode of the secondary waveguide having a secondary mode index, wherein each primary optical mode of the primary waveguide has a first primary mode index near a first end and a second primary mode index near a second end, wherein the first primary mode index is lower than the second primary mode index, and wherein the secondary mode index is between the first primary mode index and the second primary mode index, and wherein the primary waveguide comprises a central core structure and multiple neighboring core structures, wherein the central core structure is arranged between at least two of the multiple neighboring core structures, and wherein a width of the central core structure tapers toward the first end of the primary waveguide, and wherein the central core structure and the multiple neighboring core structures comprise silicon (Si).

According to some possible implementations, a method may include: guiding, by a secondary waveguide of a mode-converting optical coupler, light in one or more secondary optical modes; and guiding, by a primary waveguide of the mode-converting optical coupler, light in one or more primary optical modes, each being adiabatically coupled to a secondary optical mode of the secondary waveguide having a secondary mode index, wherein each primary optical mode of the primary waveguide has a first primary mode index near a first end and a second primary mode index near a second end, wherein the secondary mode index is between the first primary mode index and the second primary mode index, wherein the primary waveguide comprises a central core structure and one or more neighboring core structures, wherein a width of the central core structure tapers toward the first end of the primary waveguide, wherein a respective width of each of the one or more neighboring core structures tapers toward the first end of the primary waveguide, and wherein the central core structure and the one or more neighboring core structures comprise silicon (Si).

BRIEF DESCRIPTION OF THE DRAWINGS

FIGS. 1A and 1B are diagrams of a prior art mode-expanding edge coupler;

FIGS. 2A-2E are diagrams of an example mode-converting edge coupler comprising a multi-core primary waveguide, as described herein; and FIGS. 3A-3D are diagrams of another example mode-converting edge coupler comprising a multi-core primary waveguide, as described herein.

DETAILED DESCRIPTION

Figure 1C:
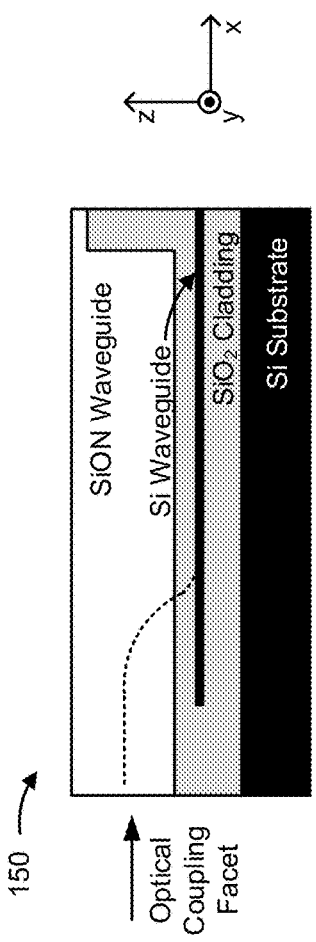
FIGS. 1C and 1D are diagrams of a prior art mode-converting edge coupler.

The following detailed description of example implementations refers to the accompanying drawings. The same reference numbers in different drawings may identify the same or similar elements. The implementations described below are merely examples and are not intended to limit the implementations to the precise forms disclosed. Instead, the implementations were selected for description to enable one of ordinary skill in the art to practice the implementations.

One technique for coupling light between an optical fiber (e.g., a single-mode optical fiber) or a laser diode and a silicon photonic optical waveguide is coupling through a surface of a silicon photonic chip, including the silicon photonic waveguide, by using a grating coupler device fabricated on the silicon photonic chip. However, this technique has a limiting optical coupling bandwidth, which is prohibitive for transceivers using multiplexed optical signals that are spaced apart over a broad wavelength range (e.g., coarse wavelength division multiplexing 4 (CWDM4)), tunable optical signals that can span a broad wavelength range (e.g., such as in a coherent application), and/or the like. As a result, another technique, edge coupling, may be needed in order to satisfy needs of a broad-bandwidth optical transceiver application.

One technique for designing an edge coupler device on a silicon photonic chip is a mode-expanding edge coupler design. FIGS. 1A and 1B are diagrams illustrating a side view and a top view, respectively, of a prior art mode-expanding edge coupler 100. As shown in FIGS. 1A and 1B, using this design approach, an optical mode of a silicon waveguide (represented by the triangle shaded region in FIG. 1A) is expanded by engineering a width (e.g., in a y-direction) of the silicon waveguide (e.g., by reducing the width of the silicon waveguide nearer to an optical coupling facet, as shown in FIG. 1B). As further shown in FIG. 1B, in a direction away from the optical coupling facet, the width of the silicon waveguide increases to a particular width, after which the width remains constant. This design allows the optical mode of the silicon waveguide to be adiabatically expanded (e.g., from approximately 0.2 microns (μm)×0.5 μm to up to several μm in diameter) in order to better match dimensions of an optical mode of the optical fiber or the laser diode (coupled at the optical coupling facet at the edge of the silicon photonic chip) and, therefore, couple efficiently to the optical fiber or the laser diode at the edge of the silicon photonic chip. However, mode-expanding edge couplers have a number of limitations. One limitation is that the optical mode of the silicon waveguide can be expanded only to a certain diameter (typically 2-3 μm) in order to avoid optical leakage loss to the silicon substrate. Thus, a degree to which the optical mode of the silicon waveguide can be expanded may be limited, thereby reducing coupling efficiency. Another limitation is that a range of mode field dimensions that can be engineered by reducing the width of the silicon waveguide is limited.

Figure 1D:
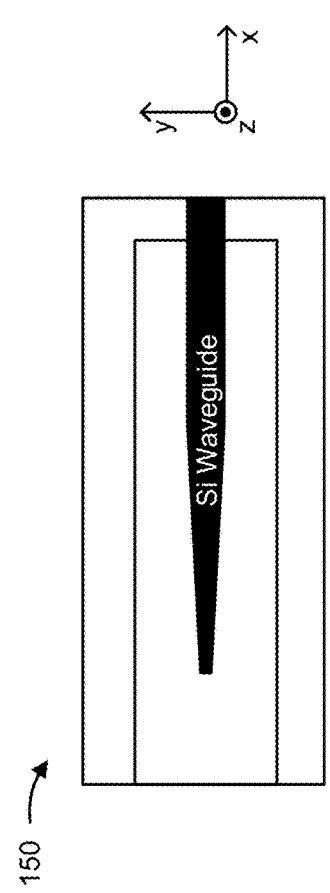

Another technique for designing an edge coupler device on a silicon photonic chip is a mode-converting edge coupler design. FIGS. 1C and 1D are diagrams illustrating a side view and a top view, respectively, of a prior art mode-converting edge coupler 150. As shown in FIGS. 1C and 1D, a comparatively larger (e.g., wider in a y-direction, thicker in a z-direction) secondary waveguide (e.g., comprising silicon oxynitride (SiON)), is fabricated in close proximity to the primary waveguide (e.g., comprising silicon (Si)), which is surrounded by a cladding (e.g., a cladding comprising silicon dioxide ($SiO_2$)). Here, an optical mode of the secondary waveguide may be designed to match that of an optical fiber or a laser diode coupled to the secondary waveguide (e.g., at an optical coupling facet at an edge of the silicon photonic chip). Here, light couples to the secondary waveguide and adiabatically transfers from the optical mode of the secondary waveguide into the optical mode of the primary waveguide. This transference can be brought about based on engineering a width (e.g., in the y-direction, as shown in FIG. 1D) of the primary silicon waveguide (e.g., by reducing the width of the primary waveguide nearer to the optical coupling facet of the secondary waveguide).

Over a range of dimensions of the primary waveguide, there is a coupling between the optical modes of the primary waveguide and the secondary waveguide which facilitates the transference of light from the optical mode of the secondary waveguide to the optical mode of the primary waveguide. Generally, mode-converting edge couplers avoid optical leakage loss to the substrate if a refractive index of the secondary waveguide is sufficiently high as compared to a refractive index of the cladding that is between the substrate and the secondary waveguide. Under this condition, the cladding serves as a barrier between the secondary waveguide and the substrate.

However, in prior art mode-expanding edge couplers and prior art mode-converting edge couplers (e.g., such as prior art mode-expanding edge coupler 100 and prior art mode-converting edge coupler 150, respectively), there is a trade-off between edge coupler length and optical insertion loss. This is because a reduction in a size of the optical mode (in the case of a prior art mode-expanding edge coupler), or conversion of the optical mode from one waveguide to another (in the case of a prior art mode-converting edge coupler), needs to be sufficiently slow so as to meet an adiabatic condition. Typically, both mode-expanding and mode-converting edge couplers are designed to be sufficiently long so as to avoid coupling penalties associated with not meeting this adiabatic condition which, in some cases, results in an edge coupler that is undesirably long (e.g., in an application where minimizing physical dimensions of the edge coupler is important). In a mode-converting edge coupler, a strength of coupling between the primary waveguide and the secondary waveguide is an important factor in determining a required coupling length, with stronger coupling leading to shorter length. A shorter length also leads to a higher coupling efficiency due to another source of loss: propagation loss. Generally, the shorter the coupler length, the lower the incurred propagation loss.

An additional challenge in edge coupler design is a size of the optical mode at the edge of the silicon photonic chip. For efficient coupling, it is desirable to make the size of the optical mode at the edge of the silicon photonic chip large so as to match that of the optical fiber or the laser diode (e.g., at the optical coupling facet). A larger mode-size at this coupling interface also leads to lower penalties associated with optical misalignment of the optical fiber or the laser diode and the silicon chip. However, a larger mode size reduces the coupling strength between the primary waveguide and the secondary waveguide in a mode-converting edge coupler design. Thus, techniques for improving the coupling between the primary waveguide and the secondary waveguide are needed in order to allow for a comparatively larger secondary waveguide that couples efficiently to a mode of the optical fiber mode or the laser diode at the edge of the silicon photonic chip, without incurring associated penalties in coupler length and insertion loss.

Some implementations described herein provide a mode-converting optical coupler that includes a primary waveguide with a multi-core structure (herein referred to as a multi-core primary waveguide). In some implementations, the multi-core primary waveguide improves strength of coupling between a secondary waveguide and the multi-core primary waveguide, thereby reducing a length of the mode-converting optical coupler and/or reducing optical insertion loss (e.g., as compared to a prior art edge coupler described above).

In some implementations, a design of the multi-core primary waveguide is independent of that of the secondary waveguide, and can be used to compensate for a reduction in coupling strength between the two waveguides caused by, for example, increasing a size of the secondary waveguide for more efficient coupling to an optical mode of an optical fiber or a laser diode at an edge of a silicon photonic chip.

Notably, while implementations described herein are described in the context of edge coupling, the mode converting optical coupler described herein can be used in one or more other applications, such as chip-chip coupling, on-chip device coupling, and/or the like, as described below.

FIGS. 2A-2E are diagrams of an example mode-converting optical coupler 200 comprising a multi-core primary waveguide that improves strength of coupling between a secondary waveguide and the multi-core primary waveguide, thereby reducing a length of mode-converting optical coupler 200 and/or reducing optical insertion loss, as described herein. As shown in FIGS. 2A-2E, mode-converting optical coupler 200 may include a substrate layer 210, a cladding layer 220, a multi-core primary waveguide 230 (including a central core structure 230-C, a neighboring core structure 230-N1, and a neighboring core structure 230-N2), and a secondary waveguide 240.

Substrate layer 210 includes a substrate on which cladding layer 220 may be formed (e.g., deposited). In some implementations, substrate layer 210 may be a silicon (Si) substrate or a similar type of material.

Cladding layer 220 includes a cladding on or in which multi-core primary waveguide 230 may be formed. In some implementations, cladding layer 220 may be formed from $SiO_2$ or a similar type of material. In some implementations, cladding layer 220 may be formed on substrate layer 210. In some implementations, cladding layer 220 may be formed such that multi-core primary waveguide 230 can be formed on or in cladding layer 220. In some implementations, a thickness of cladding layer 220 may be in a range from approximately 1 μm to approximately 4 μm, such as approximately 2.2 μm.

Multi-core primary waveguide 230 includes a waveguide to guide light in one or more primary optical modes (e.g., one or more optical modes of multi-core primary waveguide 230). In some implementations, multi-core primary waveguide 230 may couple to secondary waveguide 240 in order to convert one or more optical modes of secondary waveguide 240 (herein referred to as secondary optical modes) to one or more primary optical modes, or to convert one or more primary optical modes to one or more secondary optical modes. In some implementations, the one or more primary optical modes may include one or more TE modes and/or one or more TM modes.

In some implementations, multi-core primary waveguide 230 may be formed on or in cladding layer 220 (e.g., see FIGS. 2B-2E). In some implementations, multi-core primary waveguide 230 may include a central core structure arranged between two or more neighboring core structures. For example, as shown in FIG. 2A, multi-core primary waveguide 230 may include central core structure 230-C arranged between neighboring core structure 230-N1 and neighboring core structure 230-N2. In some implementations, as shown in FIG. 2A, mode-converting optical coupler 200 may include two neighboring core structures. Alternatively, mode-converting optical coupler 200 may include another number of neighboring core structures (e.g., one neighboring core structure, three neighboring core structures, four neighboring core structures, and/or the like).

In some implementations, one or more primary optical modes of multi-core primary waveguide 230 have stronger coupling to one or more secondary optical modes of secondary waveguide 240 (e.g., as compared to a prior art mode-converting edge coupler). This stronger coupling results from a comparatively larger mode size of multi-core primary waveguide 230 that has a greater degree of spatial overlap with the one or more secondary modes of secondary waveguide 240 (e.g., as compared to a mode size of a single core structure). Thus, in some implementations, neighboring core structure 230-N1 and neighboring core structure 230-N2 may increase coupling strength between secondary waveguide 240 and multi-core primary waveguide 230, thereby reducing a length of mode-converting optical coupler 200 and/or reducing an amount of insertion loss at mode-converting optical coupler 200.

Figure 2A:
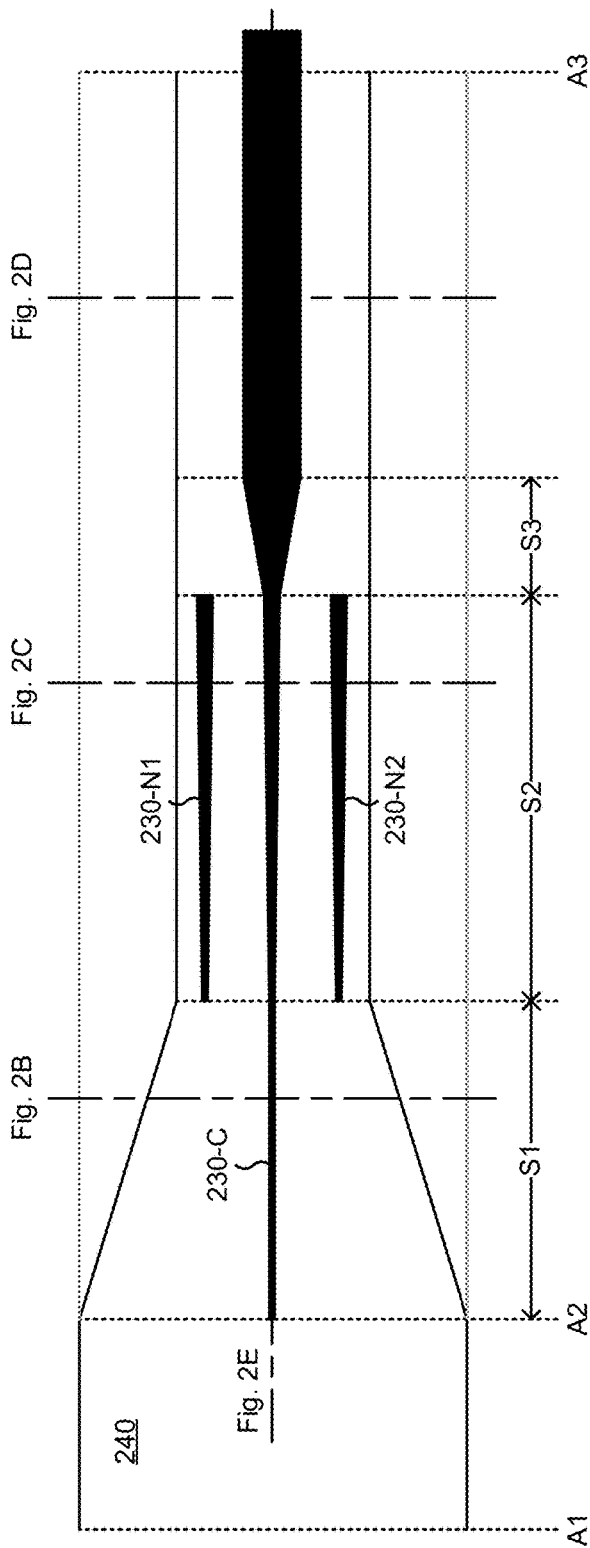
Figure 2E:
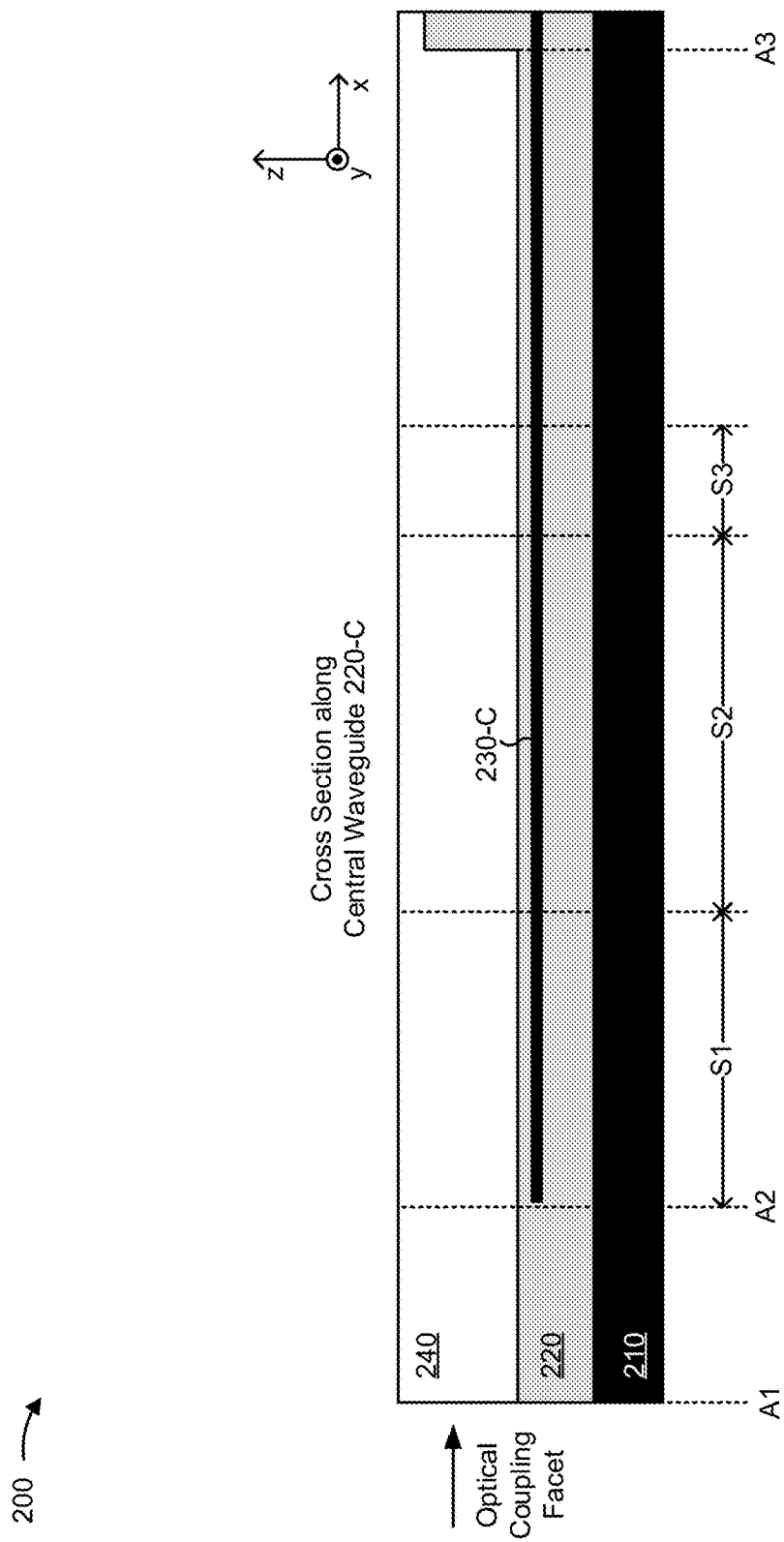

In some implementations, a mode index of a given optical mode of primary waveguide 230 (herein referred to as a primary mode index) may transition from a (comparatively lower) first primary mode index at or near a first end of primary waveguide 230 (e.g., a left end in FIG. 2A) to a (comparatively higher) second primary mode index at or near a second end of primary waveguide 230 (e.g., a right end in FIG. 2A). In some implementations, the primary mode index of the optical mode of primary waveguide 230 (e.g., a mode index associated with a particular optical mode of primary waveguide 230) may be a TE mode index or a TM mode index.

A mode index (sometimes referred to as a mode effective index or an effective mode index) describes a kind of effective refractive index of a particular optical mode of a waveguide (e.g., primary waveguide 230, secondary waveguide 240). The mode index is specific to a given optical mode for a given waveguide (i.e., the mode index can vary among optical modes of the waveguide), and may not be the same as a refractive index of a material of the waveguide. Physically, the mode index is a kind of average of refractive indices of a core of the waveguide and a cladding of the waveguide. The more "evanescent" the optical mode is (i.e., the more the optical field is in the cladding), the closer the mode index will be to a refractive index of the cladding. Conversely, the more confined the optical mode is to the core, the closer the mode index will be to the refractive index of the core.

Mode-converting optical coupler 200 achieves adiabatic coupling by slowly changing a geometry of primary waveguide 230 from one in which the primary mode index is smaller than a mode index of secondary waveguide 240 (e.g. towards the facet when primary waveguide is narrow and more evanescent) to one in which the primary mode index is larger than the mode index of secondary waveguide 240 (e.g., away from the facet when the width of primary waveguide 230 is larger). Thus, in some implementations, a mode index of a given optical mode of secondary waveguide 240 (herein referred to as a secondary mode index) may be between the first primary mode index of the optical mode of primary waveguide 230 and the second primary mode index of the optical mode of primary waveguide 230 in order to provide adiabatic coupling.

In some implementations, as shown in FIG. 2A, central core structure 230-C, neighboring core structure 230-N1, and/or neighboring core structure 230-N2 may be arranged in a direction that is substantially parallel (e.g., within approximately 0.5 degrees) to a direction in which light is to propagate through mode-converting optical coupler 200 (e.g., an x-direction in FIG. 2A).

In some implementations, multi-core primary waveguide 230 (e.g., central core structure 230-C, neighboring core structure 230-N1, and neighboring core structure 230-N2) may be formed from Si or a similar type of material. Generally, multi-core primary waveguide 230 may be formed from a material with a refractive index that is greater than that of secondary waveguide 240. For example, multi-core primary waveguide 230 may be formed from Si (n≈3.4) when secondary waveguide 240 is formed from SiON (n≈1.6). In some implementations, multi-core primary waveguide 230 may have a thickness (e.g., in the z-direction) in a range from approximately 100 nanometers (nm) to approximately 220 nm, such as approximately 215 nm.

As shown in FIG. 2A, in some implementations, a width of central core structure 230-C may vary along the x-direction (i.e., a direction in which light propagates through mode-converting optical coupler 200). For example, central core structure 230-C may have a first width (e.g., a width in a range from approximately 80 nm to approximately 200 nm, such as approximately 130 nm) in section S1 (e.g., a portion arranged below a taper in secondary waveguide 240). As further shown, the width of central core structure 230-C in section S2 may transition (e.g., from left to right in FIG. 2A) such that, at an end of section S2, central core structure 230-C has a second width (e.g., a width in a range from approximately 130 nm to approximately 450 nm, such as approximately 300 nm). As further shown, the width of central core structure 230-C may further transition in section S3 such that, at an end of section S3, central core structure 230-C has a third width (e.g., a width in a range from approximately 300 nm to approximately 800 nm, such as approximately 450 nm). In some implementations, a rate of change of the width within section S2 may be different from a rate of change of the width within section S3. As further shown, central core structure 230-C may maintain the third width after section S3. Put another way, central core structure 230-C may taper (e.g., in one or more sections, at one or more rates of change) the first end of primary waveguide 230 (e.g., moving from right to left in FIG. 2A).

As further shown in FIG. 2A, in some implementations, a width of neighboring core structure 230-N1 and/or neighboring core structure 230-N2 may vary along the x-direction. For example, in section S2 (e.g., from left to right in FIG. 2A), the width of neighboring core structure 230-N1 and/or neighboring core structure 230-N2 may transition from a first width (e.g., a width in a range from approximately 80 nm to approximately 200 nm, such as approximately 130 nm) to a second width (e.g., a width a in a range from approximately 130 nm to approximately 450 nm, such as approximately 220 nm). Put another way, neighboring core structure 230-N1 and/or neighboring core structure 230-N2 may taper toward the first end of primary waveguide 230 (e.g., moving from right to left in FIG. 2A).

In some implementations, at a given location along a length of central core structure 230-C within section S2 (i.e., a section that includes neighboring core structure 230-N1 and neighboring core structure 230-N2), a width of central core structure 230-C is greater than a width of neighboring core structure 230-N1 or neighboring core structure 230-N2. In some implementations, the comparatively greater width of central core structure 230-C within section S2 allows one or more optical modes to be smoothly pulled into central core structure 230-C after the one or more optical modes have been converted from secondary waveguide 240 to multi-core primary waveguide 230. Thus, at an interface between section S2 and section S3, one or more primary optical modes may exist at least partially (e.g., mostly, solely) in central core structure 230-C and, as a result, an amount of loss at a transition between section S2 and section S3 is reduced. In some implementations, at a given location along a length of central core structure 230-C within section S2, a width of neighboring core structure 230-N1 may match a width of neighboring core structure 230-N2.

In some implementations, a pitch between central core structure 230-C and neighboring core structure 230-N1 (e.g., from a center of central core structure 230-C to a center of neighboring core structure 230-N1) may match a pitch between central core structure 230-C and neighboring core structure 230-N2 (e.g., from a center of central core structure 230-C to a center of neighboring core structure 230-N2). In other words, multi-core primary waveguide 230 may be formed such that neighboring core structure 230-N1 and neighboring core structure 230-N2 are at a same distance from central core structure 230-C at a given location along a length of central core structure 230-C. Alternatively, a pitch between central core structure 230-C and neighboring core structure 230-N1 may be different from a pitch between central core structure 230-C and neighboring core structure 230-N2. In some implementations, the pitch between central core structure 230-C and neighboring core structure 230-N1 and/or neighboring core structure 230-N2 may be in a range from approximately 100 nm to approximately 2000 nm, such as approximately 1000 nm).

As noted, FIGS. 2B, 2C, 2D, and 2E are example cross sectional views of mode-converting optical coupler 200 in section S1, section S2, section S3, and along central core structure 230-C, respectively, that provide further illustration of the above described characteristics of multi-core primary waveguide 230.

Secondary waveguide 240 includes a waveguide to guide light in one or more secondary optical modes (e.g., one or more optical modes of secondary waveguide 240). In some implementations, secondary waveguide 240 may couple to an optical fiber or a laser diode at an optical coupling facet of mode-converting optical coupler 200 (e.g., located at line A1 in FIG. 2A). In some implementations, secondary waveguide 240 may be designed such that a size of one or more secondary optical modes at the optical coupling facet matches a size of one or more optical modes of the optical fiber or the laser diode. In some implementations, secondary waveguide 240 may be formed on cladding layer 220 and/or multi-core primary waveguide 230 (see FIGS. 2B-2E). In some implementations, the one or more secondary optical modes may include one or more TE modes and/or one or more TM modes. Further, one or more optical modes of secondary waveguide 240 may be larger than one or more optical modes of primary waveguide 230, may be smaller than one or more optical modes of primary waveguide 230, and/or may be approximately a same size as one or more optical modes of primary waveguide 230.

In some implementations, in order to provide adiabatic coupling between secondary waveguide 240 and primary waveguide 230, a secondary mode index of secondary waveguide 240 may be between a first primary mode index of primary waveguide 230 and a second primary mode index of primary waveguide 230, as described above. In some implementations, a secondary mode index of secondary waveguide 240 (e.g., a mode index associated with a particular optical mode of secondary waveguide 240) may be a TE mode index or a TM mode index.

In some implementations, secondary waveguide 240 may be formed from SiON or Indium Phosphide (InP). Generally, secondary waveguide 240 may be formed from a material with a refractive index that is less than that of multi-core primary waveguide 230. For example, secondary waveguide 240 may be formed from SiON (n≈1.6) when multi-core primary waveguide 230 is formed from Si (n≈3.4).

As shown in FIG. 2A, in some implementations, a portion of secondary waveguide 240 may be tapered such that a width (e.g., in the y-direction) of a portion of secondary waveguide 240 is reduced in a direction (e.g., an x-direction) moving away from the optical coupling facet. For example, as shown, the width of the portion of secondary waveguide 240 in the y-direction may, within section S1, taper from a first width (e.g., a width in a range from approximately 1 μm to approximately 15 μm, such as approximately 10 μm) to a second width (e.g., a width in a range from approximately 1 μm to approximately 10 μm, such as approximately 5 μm). In some implementations, the taper may have a length (e.g., a length of section S1 in the x-direction) in a range from approximately 10 μm to approximately 1000 μm, such as approximately 100 μm.

The taper in the portion of secondary waveguide 240 is further illustrated by FIGS. 2B and 2C (e.g., showing a cross section in section S1 and a cross section in section S2, respectively). In some implementations, the portion of secondary waveguide 240 that is tapered may have a thickness (e.g., in a z-direction) in a range from approximately 1 μm to approximately 15 μm, such as approximately 3 μm. In some implementations, an overall thickness of secondary waveguide 240 may be in a range from approximately 1 μm to approximately 15 μm, such as approximately 6 μm.

In some implementations, the taper of secondary waveguide 240 may reduce a size (e.g., a width) of one or more secondary optical modes in order to provide efficient coupling to multi-core primary waveguide 230. For example, one or more optical modes of secondary waveguide 240 may be larger than one or more optical modes of primary waveguide 230, in some cases. In such a case, with reference to FIG. 2A, the width of secondary waveguide 240 may be designed such that, at the optical coupling interface, a size of one or more secondary optical modes matches that of the optical fiber or the laser diode. Here, the taper (e.g., within section S1) of secondary waveguide 240 reduces the size of the one or more secondary optical modes such that, at an end of the taper (e.g., a right end of section S1 in FIG. 2A), the size of the one or more secondary optical modes more closely match the size of one or more primary optical modes of multi-core primary waveguide 230, thereby increasing coupling to multi-core primary waveguide 230 and/or allowing a coupling length to be reduced (e.g., as compared to a mode-converting optical coupler without a taper in a secondary waveguide).

As noted, FIGS. 2B, 2C, 2D, and 2E are example cross sectional views of mode-converting optical coupler 200 in section S1, section S2, section S3, and along central core structure 230-C, respectively, that provide further illustration of the above described characteristics of secondary waveguide 240.

In some implementations, mode-converting optical coupler 200 may be used in a single polarization (e.g., a TE polarization) C-band application or a dual polarization (e.g., a TE polarization and a TM polarization) C-band application. In such a case, mode-converting optical coupler 200 may have a total length in a range from approximately 0.1 millimeters (mm) to approximately 3.0 mm, such as approximately 0.84 mm.

In an example operation, in a direction of propagation from secondary waveguide 240 to multi-core primary waveguide 230, light enters secondary waveguide 240 from an optical fiber at the optical coupling interface of mode-converting optical coupler 200. At the optical coupling interface, a size of one or more secondary optical modes of secondary waveguide 240 may match a size of one or more optical modes of the optical fiber. As the light propagates in section S1 (e.g., from left to right in FIG. 2A), the size of the one or more secondary optical modes may be reduced in order to improve coupling efficiency with multi-core primary waveguide 230. Next, within section S2, the one or more secondary optical modes transition at least partially to (i.e., are at least partially converted to) one or more primary optical modes of multi-core primary waveguide 230. Finally, within section S3, the one or more primary optical modes are matched to one or more optical modes of a portion of central core structure 230-C after section S3.

In some implementations, mode-converting optical coupler 200 may be used in a single polarization (e.g., a TE polarization) O-band application. In such a case, mode-converting optical coupler 200 may have a total length in a range from approximately 0.1 millimeters (mm) to approximately 3.0 mm, such as approximately 1.0 mm.

As indicated above, FIGS. 2A-2E are provided merely as examples. Other examples are possible and may differ from what was described with regard to FIGS. 2A-2E.

FIGS. 3A-3D are diagrams of an example mode-converting optical coupler 300 comprising a multi-core primary waveguide that improves strength of coupling between a secondary waveguide and the multi-core primary waveguide, thereby reducing a length of mode-converting optical coupler 200 and/or reducing optical insertion loss, as described herein. As shown in FIGS. 3A-3D, mode-converting optical coupler 300 may include a substrate layer 210, a cladding layer 220, a multi-core primary waveguide 330 (including a central core structure 330-C, a neighboring core structure 330-N1, and a neighboring core structure 330-N2), and a secondary waveguide 240. Substrate layer 210, cladding layer 220, and/or secondary waveguide 240 may have characteristics similar to those described above in association with mode-converting optical coupler 200.

As shown in FIG. 3A, mode-converting optical coupler 300 may include a multi-core primary waveguide 330 (e.g., including a central core structure 330-C, neighboring core structure 230-N1, and neighboring core structure 330-N2). In some implementations, a number of core structures of multi-core primary waveguide 330, an arrangement of core structures in multi-core primary waveguide 330, a pitch between core structures in multi-core primary waveguide 330, and/or operational effects or characteristics of multi-core primary waveguide 330 may be similar to those described above in association with mode-converting optical coupler 200. However, width and/or thickness characteristics of multi-core primary waveguide 330 may differ from those described above in association with multi-core primary waveguide 230.

For example, as shown in FIG. 3A, in some implementations, a width of central core structure 330-C may vary along the x-direction (i.e., a direction in which light propagates through mode-converting optical coupler 300). For example, central core structure 330-C may have a first width (e.g., a width in a range from approximately 100 nm to approximately 800 nm, such as approximately 150 nm) from section S1 (e.g., a portion arranged below a taper in secondary waveguide 240) through section S4. As further shown, the width of central core structure 330-C in section S5 may increase (e.g., from left to right in FIG. 3A) such that, at an end of section S5, central core structure 330-C has a second width (e.g., a width in a range from approximately 100 nm to approximately 800 nm, such as approximately 300 nm). As further shown, the width of central core structure 330-C may further increase in section S6 such that, at an end of section S6, central core structure 330-C has a third width (e.g., a width in a range from approximately 300 nm to approximately 800 nm, such as approximately 450 nm). In some implementations, a rate of change of the width within section S5 may be different (e.g., lower) from a rate of change of the width within section S6. As further shown, central core structure 330-C may maintain the third width after section S6. Put another way, central core structure 330-C may taper (e.g., in one or more sections, at one or more rates of change) toward the first end of primary waveguide 330 (e.g., moving from right to left in FIG. 3A).

As further shown in FIG. 3A, in some implementations, a width of neighboring core structure 330-N1 and/or neighboring core structure 330-N2 may vary along the x-direction. For example, in sections S2 through section S4 (e.g., from left to right in FIG. 3A), the width of neighboring core structure 330-N1 and/or neighboring core structure 330-N2 may be a first width (e.g., a width in a range from approximately 100 nm to approximately 800 nm, such as approximately 120 nm). As further shown, within section S5, the width of neighboring core structure 330-N1 and/or neighboring core structure 330-N2 may increase from the first width to a second width (e.g., a width in a range from approximately 100 nm to approximately 800 nm, such as approximately 250 nm). Put another way, neighboring core structure 330-N1 and/or neighboring core structure 330-N2 may taper (e.g., within in at least on section) toward the first end of primary waveguide 330 (e.g., moving from right to left in FIG. 3A).

In some implementations, at a given location along a length of central core structure 330-C, a width of central core structure 330-C is greater than a width of neighboring core structure 330-N1 or neighboring core structure 330-N2. In some implementations, at a given location along a length of central core structure 330-C within section S2, a width of neighboring core structure 330-N1 may match a width of neighboring core structure 330-N2.

In some implementations, central core structure 330-C, neighboring core structure 330-N1, and/or neighboring core structure 330-N2 may have multiple thicknesses (e.g., in a z-direction) along the x-direction. For example, within section S1 and S2, central core structure 330-C may have a first thickness (e.g., a thickness in a range from approximately 0 nm to approximately 220 nm, such as approximately 30 nm). Next, within section S3, a first portion of central core structure 330-C (e.g., cross-hatched portion of central core structure 330-C in section S3 as shown in FIG. 3A) may have the first thickness, while a second portion of central core structure 330-C (e.g., a black portion of central core structure 330-C in section S3 as shown in FIG. 3A) may have a second thickness (e.g., a thickness in a range from approximately 100 nm to approximately 220 nm, such as approximately 215 nm). Notably, as shown in FIG. 3A, central core structure 330-C may transition from the first thickness to the second thickness within S3. As further shown, the entirety of central core structure 330-C may have the second thickness after section S3.

Similarly, within S2, neighboring core structure 330-N1 and/or neighboring core structure 330-N2 may have the first thickness. Next, within section S3, a first portion of neighboring core structure 330-N1 and/or a first portion of neighboring core structure 330-N2 (e.g., cross-hatched portions of neighboring core structure 330-N1 and neighboring core structure 330-N2 in section S3 as shown in FIG. 3A) may have the first thickness, while a second portion of neighboring core structure 330-N1 and a second portion of neighboring core structure 330-N2 (e.g., black portions of neighboring core structure 330-N1 and neighboring core structure 330-N2 in section S3 as shown in FIG. 3A) may have the second thickness. Notably, as shown in FIG. 3A, neighboring core structure 330-N1 and/or neighboring core structure 330-N2 may transition from the first thickness to the second thickness within S3. As further shown, the entirety of neighboring core structure 330-N1 and/or neighboring core structure 330-N2 may have the second thickness after section S3.

FIGS. 3B, 3C, and 3D are example cross sectional views of mode-converting optical coupler 300 in section S2, section S3, and section S4, respectively, that provide further illustration of the above described thickness characteristics of multi-core primary waveguide 330. In the section S2 cross section shown in FIG. 3B, central core structure 330-C, neighboring core structure 330-N1, and neighboring core structure 330-N2 have the first thickness. In the section S3 cross section shown in FIG. 3C, respective first portions of central core structure 330-C, neighboring core structure 330-N1, and neighboring core structure 330-N2 have the first thickness, while respective second portions of central core structure 330-C, neighboring core structure 330-N1, and neighboring core structure 330-N2 have the second thickness. In the section S4 cross section shown in FIG. 3D, central core structure 330-C, neighboring core structure 330-N1, and neighboring core structure 330-N2 have the second thickness.

In some implementations, mode-converting optical coupler 300 may operate in a manner similar to that described above in association with mode-converting optical coupler 200. In some implementations, mode-converting optical coupler 300 may be used in a dual polarization (e.g., a TE polarization and a TM polarization) O-band application. In such a case, mode-converting optical coupler 200 may have a total length in a range from approximately 0.1 millimeters (mm) to approximately 3.0 mm, such as approximately 2.0 mm. In some implementations, the comparatively thinner portions of central core structure 330-C, neighboring core structure 330-N1, and neighboring core structure 330-N2 nearer to the optical coupling facet allow mode-converting optical coupler 300 to be used in a dual polarization O-band application (e.g., since relatively smaller feature sizes are needed to convert the TM mode in an O-band application).

As indicated above, FIGS. 3A-3D are provided merely as examples. Other examples are possible and may differ from what was described with regard to FIGS. 3A-3D.

In some implementations, mode-converting optical coupler 200 and/or mode-converting optical coupler 300 (herein referred to collectively as mode-converting optical coupler 200/300) may be a mode-converting edge coupler, as indicated by the above described implementations. In one example in which mode-converting optical coupler 200/300 is a mode-converting edge coupler, secondary waveguide 240 may have a facet (e.g., a left facet as shown in FIG. 2A or 3A) that is butt coupled to an optical fiber. In another example in which mode-converting optical coupler 200/300 is a mode-converting edge coupler, secondary waveguide 240 may be coupled to a free-space beam (e.g., when an optical beam is focused at the facet of secondary waveguide 240).

Additionally, or alternatively, mode-converting optical coupler 200/300 may be a chip-chip coupler. For example, primary waveguide 230/330 may be fabricated on a first chip (or silicon wafer), while secondary waveguide 240 may be fabricated on a second chip (e.g., an Indium-Phosphide (InP)

chip including quantum well epitaxial layers designed to provide optical gain when electrically driven). Here, the second chip can be "flip-chipped" onto the first chip such that secondary waveguide 240 (e.g., comprising InP) is laterally arranged with respect to primary waveguide 230/330 (e.g., such that secondary waveguide 240 is arranged on top of primary waveguide 230/330) in order to provide adiabatic coupling. In some cases, a pocket may be etched above primary waveguide 230 (e.g., in cladding layer 220) in order to allow secondary waveguide 240 to be close enough to primary waveguide 230/330 for adiabatic coupling.

In some such cases, an optical resonator/cavity can be formed on the second chip. Here, the gain and cavity of the second chip mean that a laser is contained entirely on the second chip, and an output of the laser can be adiabatically coupled to primary waveguide 230/330. Conversely, in some cases, no cavity may be formed on the second chip. Here, the second chip may serve as an optical amplifier. The optical amplifier can be used to boost power of an existing optical signal on the first chip, or a cavity can be fabricated on the first chip and a laser can be formed from the combined (silicon) cavity and (InP) optical amplifier.

Additionally, or alternatively, mode-converting optical coupler 200/300 may be an on-chip device coupler. For example, primary waveguide 230/330 may be fabricated on a first chip, while secondary waveguide 240 may be fabricated as a device on the first chip (e.g., by removing a substrate of an InP chip, including secondary waveguide 240, after arrangement or mounting on the first chip). Here, secondary waveguide 240 is laterally arranged with respect to primary waveguide 230/330 (e.g., such that secondary waveguide 240 is arranged on top of primary waveguide 230/330) in order to provide adiabatic coupling.

Some implementations described herein provide a mode-converting optical coupler that includes a primary waveguide with a multi-core structure (herein referred to as a multi-core primary waveguide). In some implementations, the multi-core primary waveguide improves strength of coupling between a secondary waveguide and the multi-core primary waveguide, thereby reducing a length of the mode-converting optical coupler and/or reducing optical insertion loss (e.g., as compared to a prior art edge coupler).

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A mode-converting optical coupler, comprising:
   a secondary waveguide to guide light in one or more secondary optical modes; and
   a primary waveguide, to guide light in one or more primary optical modes, each adiabatically coupled to a secondary optical mode of the secondary waveguide having a secondary mode index,
      wherein the primary waveguide is between the secondary waveguide and a substrate layer of the mode-converting optical coupler,
      wherein each primary optical mode of the primary waveguide has a first primary mode index near a first end and a second primary mode index near a second end,
         wherein the first primary mode index is lower than the second primary mode index, and
         wherein the secondary mode index is between the first primary mode index and the second primary mode index, and
      wherein the primary waveguide comprises a plurality of core structures including a central core structure arranged between a first neighboring core structure and a second neighboring core structure, and
         wherein a width of each of the plurality of core structures tapers towards the first end of the primary waveguide,
         wherein each of the plurality of core structures is arranged in a direction that is substantially parallel to the direction in which light propagates through the primary waveguide, and
         wherein the plurality of core structures comprises silicon (Si).

2. The mode-converting optical coupler of claim 1, wherein the secondary waveguide has a facet that is butt coupled to an optical fiber.

3. The mode-converting optical coupler of claim 1, wherein the secondary waveguide is coupled to a free-space beam.

4. The mode-converting optical coupler of claim 1, wherein the mode-converting optical coupler is a chip-chip coupler.

5. The mode-converting optical coupler of claim 1, wherein the mode-converting optical coupler is an on-chip device coupler.

6. The mode-converting optical coupler of claim 1, wherein the one or more secondary optical and the one or more primary optical modes include one or more TE modes, one or more TM modes, or some combination thereof.

7. The mode-converting optical coupler of claim 1, wherein the one or more secondary optical modes are larger than the one or more primary optical modes.

8. The mode-converting optical coupler of claim 1, wherein the central core structure is at least as wide as the first neighboring core structure and the second neighboring core structure at a given location along a length of the central core structure.

9. The mode-converting optical coupler of claim 1, wherein the secondary waveguide comprises silicon oxynitride (SiON).

10. The mode-converting optical coupler of claim 1, wherein the primary waveguide is arranged on or in a cladding layer,
    wherein the cladding layer comprises silicon dioxide ($SiO_2$).

11. The mode-converting optical coupler of claim 1, wherein the secondary waveguide tapers toward the first end of the primary waveguide.

12. The mode-converting optical coupler of claim 1, wherein the plurality of core structures includes a third neighboring core structure,
    wherein the first neighboring core structure is arranged between the central core structure and the third neighboring core structure.

13. The mode-converting optical coupler of claim 1, wherein the central core structure has a first width in a first section along a length of the central core structure, transitions from the first width to a second width in a second section along the length of the central core structure, and transitions from the second width to a third width in a third section along the length of the central core structure,
    wherein the second section is between the first section and the third section, and
    wherein the second width is less than the first width and greater than the third width.

14. The mode-converting optical coupler of claim 1, wherein at a given location along a length of the central core structure, a pitch between central core structure and the first neighboring core structure matches a pitch between the central core structure and the second neighboring core structure.

15. The mode-converting optical coupler of claim 1, wherein at a given location along a length of the central core structure, a width of the first neighboring core structure matches a width of the second neighboring core structure.

16. The mode-converting optical coupler of claim 1, wherein the central core structure has a first thickness in a first section along a length of the central core structure, has the first thickness in a first portion of a second section along the length of the central core structure, has a second thickness in a second portion of the second section along the length of the central core structure, and has the second thickness in a third section along the length of the central core structure,
    wherein the second section is between the first section and the third section,
    wherein the second thickness is different from the first thickness.

17. The mode-converting optical coupler of claim 1, wherein the first neighboring core structure has a first thickness in a first section along a length of the first neighboring core structure, has the first thickness in a first portion of a second section along the length of the first neighboring core structure, has a second thickness in a second portion of the second section along the length of the first neighboring core structure, and has the second thickness in a third section along the length of the first neighboring core structure,
    wherein the second section is between the first section and the third section,
    wherein the second thickness is different from the first thickness.

18. A mode-converting optical coupler, comprising:
    a secondary waveguide to guide light in one or more secondary optical modes; and
    a primary waveguide, to guide light in one or more primary optical modes, each adiabatically coupled to a secondary optical mode of the secondary waveguide having a secondary mode index,
        wherein the primary waveguide is between the secondary waveguide and a substrate layer of the mode-converting optical coupler,
        wherein each primary optical mode of the primary waveguide has a first primary mode index near a first end and a second primary mode index near a second end,
            wherein the first primary mode index is lower than the second primary mode index, and
            wherein the secondary mode index is between the first primary mode index and the second primary mode index, and
        wherein the primary waveguide comprises a central core structure and multiple neighboring core structures,
            wherein the central core structure is arranged between at least two of the multiple neighboring core structures, and
            wherein a width of the central core structure tapers toward the first end of the primary waveguide, and
        wherein the central core structure and the multiple neighboring core structures comprise silicon (Si).

19. The mode-converting optical coupler of claim 18, wherein the central core structure and the multiple neighboring core structures are arranged in a direction that is substantially parallel to a direction in which light propagates through the primary waveguide.

20. A method, comprising:
    guiding, by a secondary waveguide of a mode-converting optical coupler, light in one or more secondary optical modes; and
    guiding, by a primary waveguide of the mode-converting optical coupler, light in one or more primary optical modes, each being adiabatically coupled to a secondary optical mode of the secondary waveguide having a secondary mode index,
        wherein the primary waveguide is between the secondary waveguide and a substrate layer of the mode-converting optical coupler,
        wherein each primary optical mode of the primary waveguide has a first primary mode index near a first end and a second primary mode index near a second end,
            wherein the secondary mode index is between the first primary mode index and the second primary mode index,
        wherein the primary waveguide comprises a central core structure and one or more neighboring core structures,
        wherein a width of the central core structure tapers toward the first end of the primary waveguide,
        wherein a respective width of each of the one or more neighboring core structures tapers toward the first end of the primary waveguide, and
    wherein the central core structure and the one or more neighboring core structures comprise silicon (Si).

* * * * *